United States Patent
Liang et al.

(10) Patent No.: US 10,518,765 B2
(45) Date of Patent: Dec. 31, 2019

(54) ELECTRONIC STABILITY CONTROL SYSTEM FOR ELECTRIC DRIVE VEHICLE

(75) Inventors: Wei Liang, Farmington Hills, MI (US); Hai Yu, Canton, MI (US); Ryan Abraham McGee, Ann Arbor, MI (US); Ming Lang Kuang, Canton, MI (US); Anthony Mark Phillips, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2166 days.

(21) Appl. No.: 13/347,768

(22) Filed: Jan. 11, 2012

(65) Prior Publication Data
US 2013/0179015 A1 Jul. 11, 2013

(51) Int. Cl.
*B60W 10/08* (2006.01)
*B60W 10/184* (2012.01)
(Continued)

(52) U.S. Cl.
CPC ............. *B60W 10/08* (2013.01); *B60L 3/102* (2013.01); *B60L 15/2009* (2013.01); *B60T 8/1755* (2013.01); *B60W 10/06* (2013.01); *B60W 10/184* (2013.01); *B60W 10/188* (2013.01); *B60W 20/00* (2013.01); *B60W 30/02* (2013.01); *B60L 2240/22* (2013.01); *B60L 2240/423* (2013.01); *B60L 2240/463* (2013.01); *B60L 2240/465* (2013.01); *B60T 2201/14* (2013.01); *B60W 2520/105* (2013.01); *B60W 2520/14* (2013.01); *B60W 2710/0666* (2013.01); *B60W 2710/083* (2013.01); *B60W 2720/14* (2013.01); *B60W 2720/30* (2013.01);
(Continued)

(58) Field of Classification Search
None
See application file for complete search history.

(56) References Cited

U.S. PATENT DOCUMENTS 4,484,280 A * 11/1984 Brugger .................. B60T 8/175
180/197
6,909,959 B2 6/2005 Hallowell
(Continued)

FOREIGN PATENT DOCUMENTS

CN 101070068 A 11/2007
CN 101151182 A 3/2008
(Continued)

OTHER PUBLICATIONS

Donghyun Kim et al., Advanced Active Safety System using Separated Front and Rear Motor Control for a 4WD Hybrid Electric Vehicle, Solid State Phenomena, vol. 120 (2007) pp. 223-228.
(Continued)

*Primary Examiner* — Shelley Chen
(74) *Attorney, Agent, or Firm* — David Kelley; Brooks Kushman, P.C.

(57) ABSTRACT

A stability control system for a vehicle that has an electric traction motor that provides torque to an axle through a differential. The traction motor responds to an instability event that is sensed by sensors on the vehicle by initially reducing the torque provided to the traction wheels to regain steering control. The traction motor then pulses increased torque in sequence with the application of braking force to provide enhanced direct yaw moment control.

14 Claims, 4 Drawing Sheets

(51) Int. Cl.
*B60W 20/00* (2016.01)
*B60W 30/02* (2012.01)
*B60W 10/06* (2006.01)
*B60W 10/188* (2012.01)
*B60L 3/10* (2006.01)
*B60L 15/20* (2006.01)
*B60T 8/1755* (2006.01)

(52) U.S. Cl.
CPC .......... *Y02T 10/6286* (2013.01); *Y02T 10/645* (2013.01); *Y02T 10/72* (2013.01); *Y02T 10/7275* (2013.01)

(56) References Cited

U.S. PATENT DOCUMENTS

| | | | |
|---|---|---|---|
| 7,640,081 B2* | 12/2009 | Lu | B60G 17/016 |
| | | | 701/1 |
| 7,997,363 B2 | 8/2011 | Mori et al. | |
| 8,437,914 B2 | 5/2013 | Yu et al. | |
| 8,504,238 B2 | 8/2013 | Yu et al. | |
| 8,655,563 B2 | 2/2014 | Maeda et al. | |
| 8,954,249 B2* | 2/2015 | Nakatsu | B60L 3/102 |
| | | | 701/70 |
| 2005/0103551 A1* | 5/2005 | Matsuno | B60K 6/48 |
| | | | 180/243 |
| 2007/0265758 A1* | 11/2007 | Miura | B60T 8/1755 |
| | | | 701/72 |
| 2008/0221766 A1* | 9/2008 | Maeda | B60T 8/1755 |
| | | | 701/70 |
| 2010/0138127 A1* | 6/2010 | Boughtwood | B60L 7/006 |
| | | | 701/71 |
| 2011/0125368 A1* | 5/2011 | Yokota | B60T 8/17554 |
| | | | 701/41 |
| 2011/0257826 A1* | 10/2011 | Yu | B60K 6/448 |
| | | | 701/31.4 |
| 2012/0150376 A1* | 6/2012 | Ash | B60L 7/26 |
| | | | 701/22 |
| 2013/0013151 A1* | 1/2013 | Schafiyha | B60T 8/17555 |
| | | | 701/41 |
| 2013/0173127 A1* | 7/2013 | Nakatsu | B60L 3/102 |
| | | | 701/70 |

FOREIGN PATENT DOCUMENTS

| | | |
|---|---|---|
| CN | 101392690 A | 3/2009 |
| CN | 101795908 A | 8/2010 |
| CN | 102218988 A | 10/2011 |
| EP | 1849745 A1 | 10/2007 |
| GB | 2348253 | 9/2000 |
| JP | 2007331540 | 12/2007 |
| WO | 2007/044744 | 4/2007 |

OTHER PUBLICATIONS

Chinese Office Action dated Apr. 6, 2016 from corresponding foreign application No. CN20130009943.6, filed Jan. 10, 2013, 7 pages.

Anstrom, Joel R., "Modeling Transient Response of Hybrid Vehicle with Stability Algorithm," Proceedings of the IMECE2006, 2006 ASME International Mechanical Engineering Congress and Exposition, Nov. 5-10, 2006, Chicago, Illinois, USA, 9 pages.

Wheals, Jonathan C., et al., "Torque Vectoring AWD Driveline: Design, Simulation, Capabilities and Control," 2004 SAE World Congress, Detroit, Michigan, Mar. 8-11, 2004, ISBN 0-7680-1319-4, 22 pages.

Fifth Office Action in corresponding Chinese Patent Application No. 201310009443.6 dated Mar. 5, 2019, Translation by Ming & Sure Intellectual Property Firm, 8 pages.

* cited by examiner

ELECTRONIC STABILITY CONTROL SYSTEM FOR ELECTRIC DRIVE VEHICLE

TECHNICAL FIELD

The disclosed concept relates to an electronic control system that increases vehicle stability by minimizing the tendency of a vehicle to spin. A potential loss of steering control is avoided by applying the brakes and also utilizing the rapid response capability of a drivetrain incorporating an electric motor to provide yaw rate control.

BACKGROUND

When a conventional electronic stability control system detects a loss of steering control, the brakes are automatically applied to assist in steering the vehicle. Braking force is applied to the wheels individually, such as the outer front wheel to counter over steer or the inner rear wheel to counter under steer. Electronic stability control systems may also reduce engine power until control is regained.

Active braking systems, or differential braking systems, apply different braking forces to each of the four wheels of a vehicle to produce a different braking force between the left and right wheels.

Figure 1A:
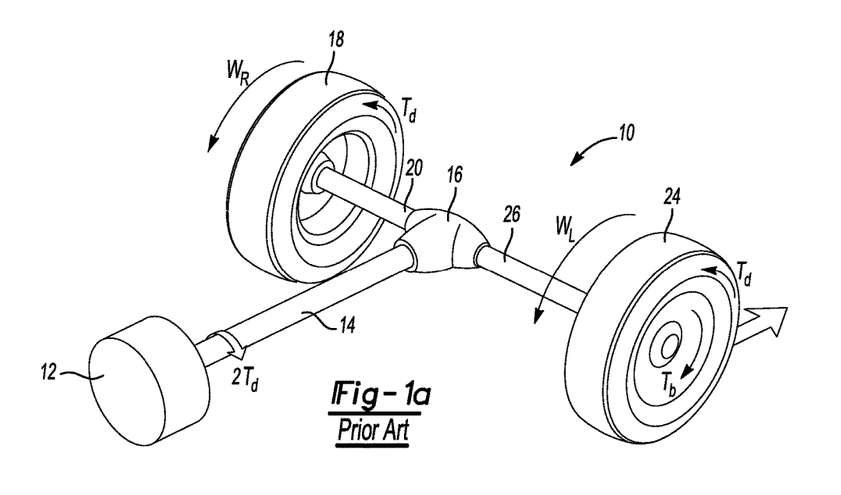
FIG. 1a is a diagrammatic perspective view of a drivetrain, wheels and axle of a prior art stability control system.

Referring to FIG. 1a, one example of an active braking system is illustrated. A drive train 10 includes a traction engine or traction motor 12 that drives a drive shaft 14 with a torque of $2\tau_d$ that is provided to an open differential 16. A right wheel 18 is driven by a right axle 20 that provides torque $\tau_d$ to the right wheel to impart angular velocity $\omega_R$ to the right wheel 18. A left wheel 24 is driven by a left axle 26 that provides torque $\tau_l$ to the left wheel 26 to impart angular velocity $\omega_L$ to the left wheel 26. Braking force $\tau_b$ is illustrated to be applied to the left wheel 24 for electronic stability control.

Figure 1B:
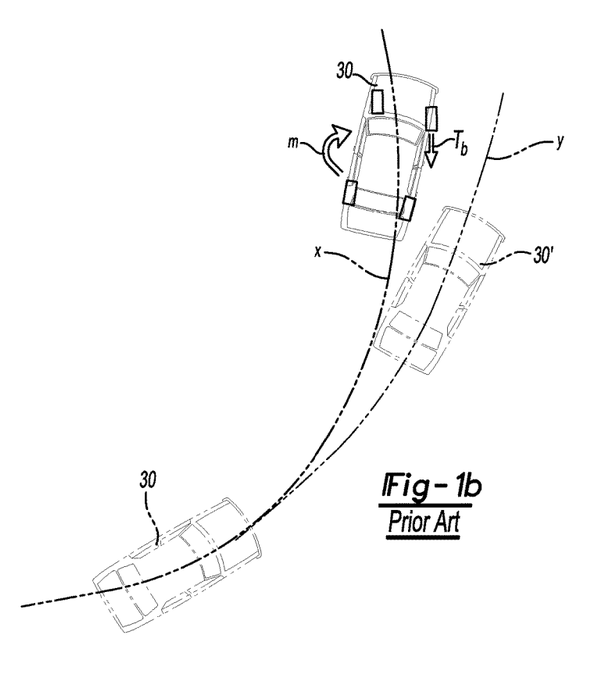
FIG. 1b is a diagrammatic view of a vehicle in an over steer situation with a prior art stability control system.

Referring to FIG. 1b, an over steering situation is illustrated for a vehicle 30. The vehicle is traveling on an over steer path x but it is intended to be following the desired path y. The electronic stability control system is shown to be applying a braking force $\tau_b$ to the right front wheel to create a yaw moment as indicated by the arrow m. The difference in applied braking forces applied may generate yaw moments under a wide range of conditions of vehicle operation. The total torque distribution provided to the outside wheels is limited to 50% torque transfer from the motor.

The problems and shortcomings of the above systems are addressed by the disclosed system as summarized below.

SUMMARY

According to one aspect of the disclosed system, improved stability control is provided in a vehicle by coordinating brake application with the control of an electrically driven traction motor. The electrically driven traction motor may be used to reduce the time required to reduce the torque provided to the traction wheel in a stability control event compared to the time required to reduce the torque output of an internal combustion engine.

The electrically driven traction motor provides torque through a drive train that includes a differential. Both traction torque and braking torque may be provided using a coordinated control strategy on the same axle. Braking force may be applied to the wheel or wheels on one side of the vehicle at the same time traction torque is supplied in a controlled manner to the wheel or wheels on the other side of the vehicle.

According to another aspect of the disclosure, an open differential system is driven by an electric central traction motor to increase the maximum direct yaw vectoring that may be obtained for front wheel drive (FWD), rear wheel drive (RWD), and all-wheel drive (AWD) vehicles. The system is effective whether the vehicle is moving in a straight line or in a turn. Driving, braking, and combined driving and braking torque may be applied to obtain maximum friction force in a variety of road conditions ranging from dry pavement to ice.

These and other aspects of this disclosure will be better understood in view of the attached drawings and the following detailed description of the illustrated embodiments.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the present invention.

Figure 2A:
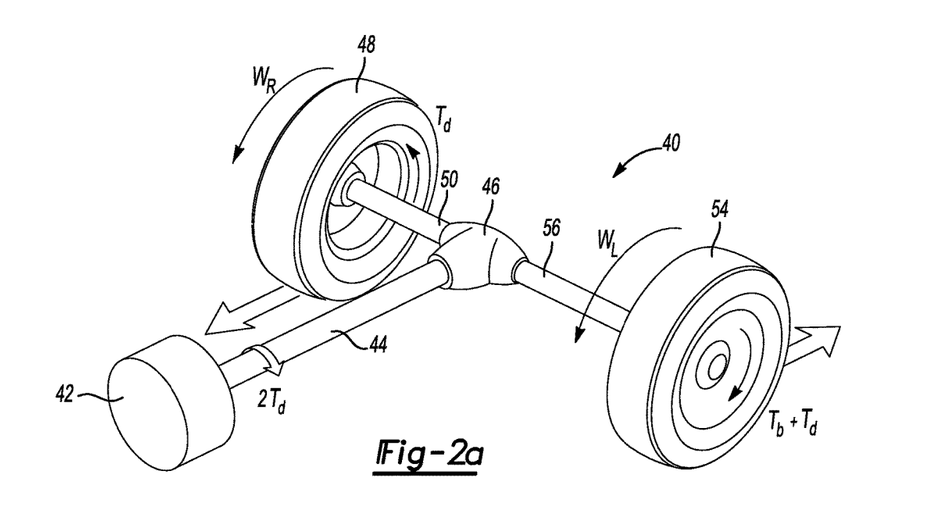
FIG. 2a is a diagrammatic perspective view of a drivetrain, wheels and axle of the enhanced stability control system as disclosed.

Referring to FIG. 2a, one example of an active braking system is illustrated. A drive train 40 includes an electric fraction motor 42 that drives a drive shaft 44 with a torque of $2\tau_d$ that is provided to an open differential 46. The traction motor 42 may provide torque in conjunction with an internal combustion engine (not shown) or independently. A right wheel 48 is driven by a right axle 50 that provides torque $\tau_d$ to the right wheel to impart angular velocity $\omega_R$ to the right wheel 48. A left wheel 54 is driven by a left axle 56 that provides torque $\tau_1$ to the left wheel 56 to impart angular velocity $\omega_L$ to the left wheel 56. Braking force $\tau_b$ is illustrated as being applied to the left wheel 54 for electronic stability control.

Figure 2B:
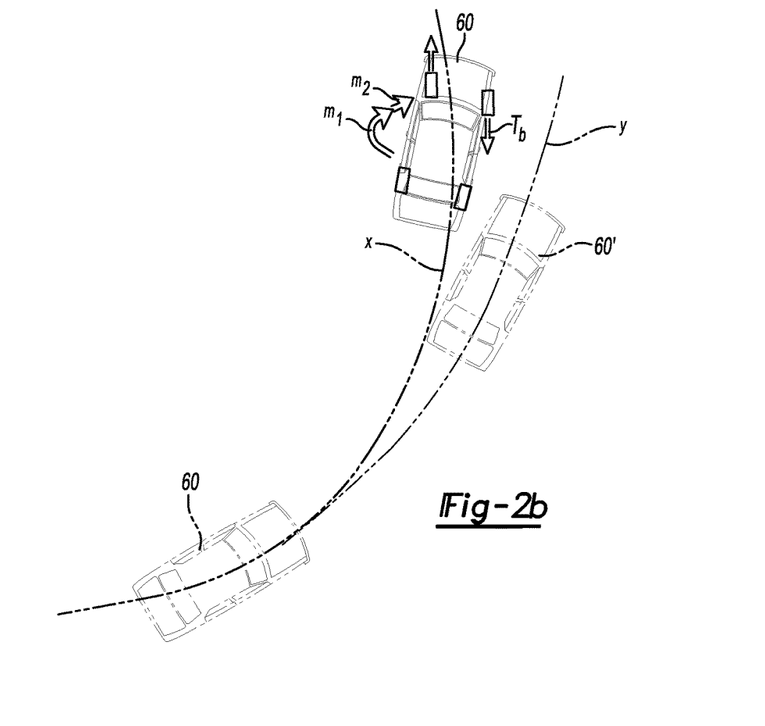
FIG. 2b is a diagrammatic view of a vehicle in an over steer situation with the enhanced stability control system as disclosed.

Referring to FIG. 2b, an over steering situation is illustrated for a vehicle 60. The vehicle 60 is traveling on an over steer path x, but it is intended to be following the desired path y. The electronic stability control system is shown as applying a braking force $\tau_b$ to the right front wheel to create a yaw moment as indicated by the arrow $m_1$. The electronic stability control system also provides increased torque from the electric traction motor 42 to provide additional yaw moment $m_2$ to the left front wheel 54 that is indicated by the arrow $\tau_d$. This added drive torque creates added yaw moment to assist in more rapidly correcting the over steer problem and allows the vehicle to return to the desired path y more rapidly.

Figure 3:
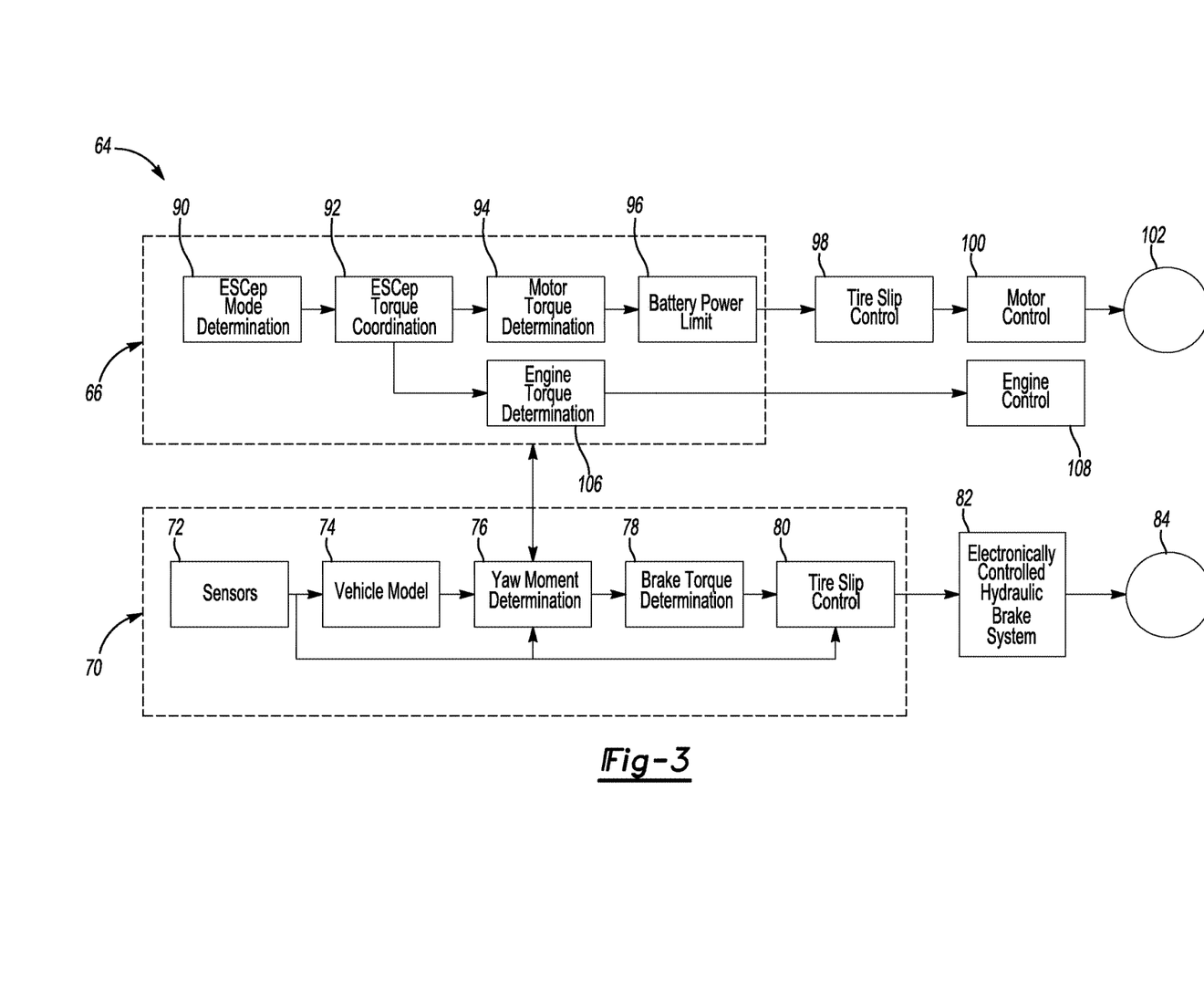
FIG. 3 is a flowchart of the enhanced electronic stability control system.

Referring to FIG. 3, an electronic stability control system 64 is disclosed in as control flowchart to provide improved yaw moment control for a vehicle 60 such as a Hybrid Electric Vehicle (HEV), Electric Vehicle (EV) or Plug-in Hybrid Electric Vehicle (PHEV) that have an electric traction motor 42 in a powertrain 40 that provides partial or full driving torque during normal operation. The traction motor 42 has a faster response time to provide torque in response to a torque command than an internal combustion engine.

The vehicle system control (VSC) 64 for a HEV, EV and PHEV has the authority to coordinate all subsystem controllers such as the traction control module 66 and brake system control module 70. The vehicle system control 64 can reduce the torque output of an internal combustion engine and also provide torque from the electric traction motor 42 to more rapidly reduce the torque provided to the traction wheel. The vehicle system control 64 may also control the use of brake torque and traction torque simultaneously for yaw moment generation by collaborating between the traction control module 66 and the brake system control module 70.

The VSC system 64 is configured to increase stabilizing yaw moment when necessary in extreme vehicle scenarios for an HEV, EV, or PHEV that is equipped with the electric traction motor 42. A maximum yaw moment is achieved by applying a braking friction force on one side of vehicle, in a manner that is similar to a current commercial electronic stability control system, and at the same time regulating the electric traction motor 42 so that additional traction force is delivered to the wheel on the other of the vehicle. The vehicle system control 64 utilizes the fast response of the electric fraction motor 42 in conjunction with the brake system control module 70 so that both traction and braking friction is delivered on a single axle. The proposed vehicle control system 64 may be used with an open differential and does not require, but does not exclude, the option of a locked differential or limited slip differential as used in some other types of traction-based systems.

The vehicle system control 64 includes sensors 72 such as a yaw rate sensor, a lateral acceleration sensor and a steering wheel sensor. Information regarding the vehicle, such as the steering wheel position, is provided at 74 to calibrate the yaw moment determination at 76. An individual wheel brake is applied when the measured yaw rate is beyond a threshold for the desired yaw rate for given steering wheel input. If an undesired yaw moment is detected by the sensors, a yaw moment determination is triggered at 76, and a signal is sent to the block labeled brake torque determination 78 at the same time that a signal is sent to the traction control module 66. The brake torque determination at 78 provides a signal to the tire slip control at 80. The tire slip control 80 provides a brake actuation signal to the electronically controlled hydraulic brake system at 82 that provides a braking torque $\tau_b$ to the brake wheel 84. The brake control module is in the controller area network (CAN) communication with the powertrain control.

The signal sent to the traction control module 66 initiates an electronic stability control mode determination step at 90 that in a hybrid vehicle determines whether the vehicle is being driven by the electric traction motor, the internal combustion engine, or both. In a PHEV or battery electric vehicle (BEV) there is no need to determine the mode of operation. In the electronic stability control torque coordination step at 92, the torque provided by the engine and motor are coordinated. If the electric motor 42 is on and running below its maximum rated value, a signal is provided in a motor torque determination step at 94 that calculates the desired level of torque increase by the motor. Once the amount of increase in motor torque is determined at 94, the battery monitoring circuit is queried at 96 to verify that there is sufficient power in the battery to provide the requested torque increase. If so, the tire slip control step at 98 signals the motor at 100 to provide increased torque $\tau_d$ to the traction wheel 102 for increased yaw moment by imparting additional angular velocity $\omega_R$ to the traction wheel 102. The traction wheel 102 is the wheel that is not to be braked.

The electronic stability control torque coordination function at 92 may send a request to the powertrain controller to reduce engine torque output to prevent the other driven wheel from over-spinning. If it is determined that the internal combustion engine is running at the electronic stability control torque coordination step 92, the engine torque determination step at 106 provides a signal to the engine control at 108 to reduce the torque output of the internal combustion engine.

In the case that one wheel brake torque is on, the generated yaw moment is:

$$M = F_b \frac{b}{2} \quad (1)$$

where $F_b$ is the brake force and b is the width of the axle.

The proposed electronic stability control system does not require any additional vehicle state or acceleration sensors. The electronic stability control in brake control module 70 sends a request to the transaxle controller 66, which determines the motor traction torque required for specific traction torque delivery, at 94. The transaxle control 66 delivers the additional torque only if the feature is enabled by the vehicle system control. The command motor traction torque may be filtered to apply motor torque on the driveline right at the same time the brake torque is applied on the wheel/wheels of the other side. The determination of the filter constant may be calibrated for each specific brake control system taking into account hydraulic actuator delay and an electric powertrain with motor low level control.

The proposed mechanism provides better control of vehicle speed. One special situation is Pure Yaw Moment (PYM) generation in which identical brake torque and traction torque are provided on two wheels of an axle but in opposite directions. In PYM vehicle speed is only minimally impacted. In other scenarios the system may be used to generate extra traction torque to help the vehicle to be pulled out of the bad surface condition.

The yaw moment in the proposed system has the following form $$M = (F_b + F_d)\frac{b}{2} \quad (2)$$

where: $F_d$ is the driving force generated by the electric motor on one side of the wheel.

By comparing the yaw moment created by equation (1) with that of equation (2), it can be seen that the capability of the electronic stability control system is dramatically increased under the same vehicle and traction conditions and is helpful in achieving stability in extreme cases.

The proposed system can be used with HEV/EV/PHEV with one or two electric drive line systems. The yaw moment control implementing increased traction force may be implemented on each of two driven axles. On two wheel drive vehicles with electrified powertrains, the proposed electronic stability control can be implemented on the driven axle. On the HEV/EV/PHEV with dual electric drive, the desired system will have better performance if both axles and all four wheels are controlled for yaw moment correction.

Figure 4:
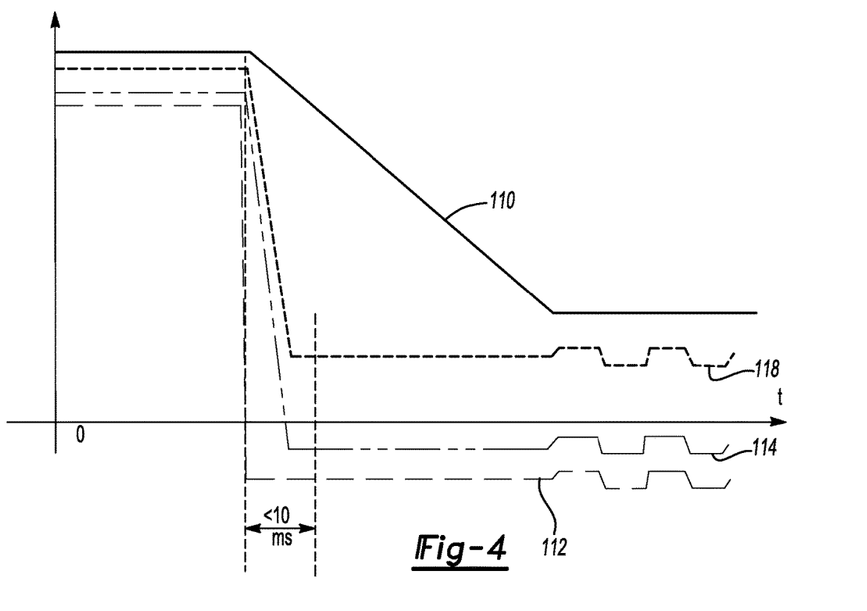
FIG. 4 is a chart illustrating one example of the enhanced stability control system in a hybrid electric vehicle responding to a stability control event.

Referring to FIG. 4, the timing of engine torque adjustments by the electronic stability control are illustrated in one exemplary stability control event. The timing of the requested engine torque is illustrated by the line 110, the brake torque is illustrated by the line 112, the motor torque is illustrated by the line 114, and traction wheel torque is illustrated by the line 118. At the beginning of the electronic stability control event, the engine torque 110 is seen to be reduced slowly. The motor torque 114 can be quickly reduced and used to reduce the combined torque provided to the traction wheel by the internal combustion engine and the electric traction motor that may provide negative torque. The torque provided by the electric traction motor then may be controlled in conjunction with the application of braking torque 112. The motor torque can be used to regulate the overall wheel torque 118 designated by the stability controller. In one example, the target motor torque control is regulated on the traction wheel to match the brake wheel torque but in the opposite direction so that both can simultaneously contribute to direct yaw moment generation. Alternatively, the motor torque and braking torque are independent of one another and vary as needed to provide the appropriate yaw moment and electronic stability control.

Figure 5:
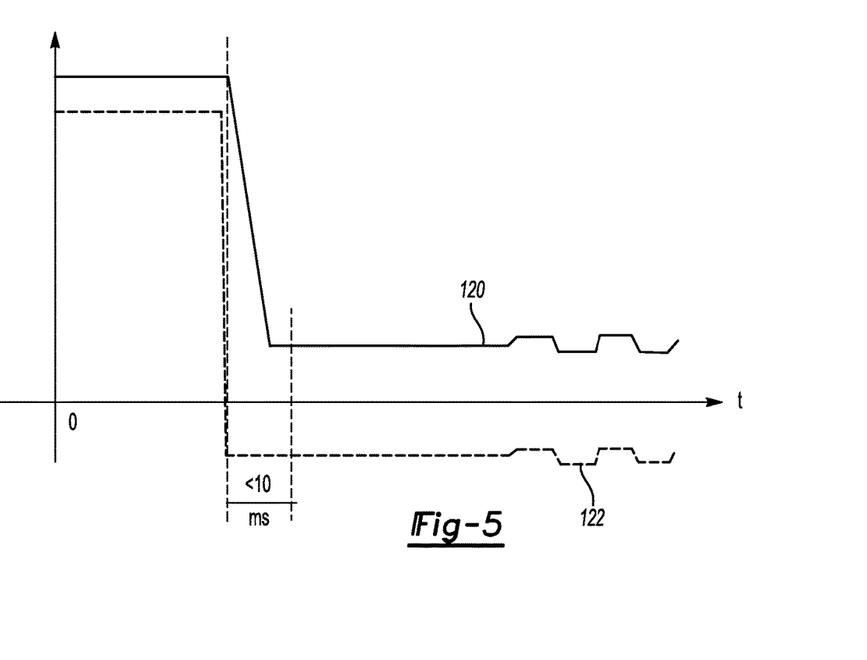
FIG. 5 is a chart illustrating one example of the enhanced stability control system in a battery electric vehicle responding to a stability control event.

Referring to FIG. 5, the operation of the electronic stability control system on an Electric Vehicle (EV) is illustrated. The EV does not have an internal combustion engine and as a result the motor torque 120 may be reduced even more rapidly at the beginning of the electronic stability control event. The electronic stability control system may apply intermittent braking torque 122 to reduce the angular velocity of the braked wheel 84 while the motor torque 120 is increased intermittently in tandem with, or independently from, the application of brake wheel torque 122. The timing of the adjustments to motor and braking torque may be changed from the examples shown in FIGS. 4 and 5 depending upon the vehicle characteristics and aggressiveness of the electronic stability control system.

One of the properties of tire friction is that both longitudinal (braking/traction) friction and the lateral (cornering) friction are functions of the tire longitudinal slip ratio. The longitudinal friction has a peak value at some slip ratio and the lateral friction force usually decreases with the increase of the slip ratio. Tire friction at a given slip angle (slip angle is dominated by vehicle state and not controlled in electronic stability control) is on an ellipsoid. Certain slip ratios will lead to the maximum overall yaw moment generated by a tire.

In electronic stability control mode, a wheel torque command can be determined by a vehicle level stability controller if a moderate yaw moment is desired. The desired slip ratio then can be determined by a nonlinear function to the wheel torque command based tire parameters:

$$\lambda = T(M) \tag{3}$$

where $\lambda$ is slip ratio, and
M is the overall yaw moment.

The desired slip ration is more complex when the maximum yaw moment is desired in the extreme vehicle operation cases. The overall direct yaw moment by one wheel can be written as:

$$M(\lambda) = F_x(\lambda)\frac{b}{2} + F_y(\lambda)l \tag{4}$$

where $F_x(\lambda)$ is the braking/traction friction,
$F_y(\lambda)$ is the lateral friction, and
l is the distance between the wheel and the center of gravity of the vehicle.

Braking/Traction friction and lateral friction are both functions of $\lambda$ and the maximum yaw moment M is obtained at certain value of $\lambda$. Certain $\lambda$ will be the optimum if the maximum yaw is desired, thus:

$$\lambda^* = \underset{\lambda}{\operatorname{argmax}} M(\lambda) \tag{5}$$

Based on these calculations, the electronic stability control system first determines an optimal slip ratio at given vehicle state that maximizes tire lateral stabilizing moment. This is referred to as the slip control reference and is provided at 80 and 98 as a command to the low level slip controller.

An additional slip controller in the traction control module 66 is provided as a coordinated system to obtain maximum stabilizing yaw moment of a driven axle in extreme vehicle scenarios. The powertrain and brake torque during a yaw moment control event of the electronic stability control system is provided because the fraction motor 42 can provide partial or full wheel torque together with the engine.

The electronic stability control provides additional slip control by:

1. Cancelling out engine torque on the wheel at the beginning of an ESP event. By reducing engine torque, the traction wheel torque is reduced much faster than with conventional electronic stability control implementation and reduces the likelihood of spinning the traction wheel; and 2. Maintaining and regulating the level of torque at a controlled level so that the slip control reference is delivered.

The slip controller in the traction control module 66 is the low level controller for electronic stability control. When electronic stability control is on, the slip controller overrides the regular motor torque control. Multiple methods can be used by the slip controller that follow the design of slip controllers for anti-lock braking systems (ABS) and traction control systems.

The overall drive force on the vehicle is be regulated because the traction/braking force on both sides of tires are controlled in a closed-loop during electronic stability control.

The overall drive force on a driven axle is:

$$F_a = F_b + F_d \tag{6}$$

The following three modes can be achieved by the electronic stability control system by regulating $F_b$ and $F_d$ through the slip controller and the wheel torque targets:

1. Pure Yaw Moment Control

The control target is $$F_a = 0 \tag{7}$$

thus no acceleration is generated by the electronic stability control.

2. Deceleration During Electronic Stability Control

The control target is $$F_a < 0 \quad (8)$$

thus the vehicle is decelerated by the electronic stability control.

3. Pull-Out During Electronic Stability Control

The control target is $$F_a > 0 \quad (9)$$

thus the drive force tries to pull vehicle out of the surface condition during electronic stability control.

Pure yaw moment control is desired when the yaw moment is desired without impact on vehicle speed. Deceleration during electronic stability control is desired during some maneuvers in which slowing down the vehicle is the best choice. Pull-out during electronic stability control is useful when the controller can tell that pulling the vehicle out of the current surface condition is desired while generating a stabilizing yaw moment.

TABLE 1

The Effect of Additional Force on Vehicle Speed

| | $F_b + F_d$ | Usage Cases |
|---|---|---|
| Accelerating | >0 | Drive vehicle out of the spot (typically for over steered case) |
| Cruising | 0 | Follow driver's vehicle torque command |
| Decelerating | <0 | Slow down the vehicle to gain lateral traction (typically for the under steered case) |

The major advantages of the system include higher yaw moment generation that increases the ability of the system to stabilize a vehicle. The proposed electronic stability control system does not require additional sensors and only requires control system algorithm modifications to coordinate the electrified powertrain and current electronic stability control system. The electronic stability control system may be adapted for HEV, EV or PHEV systems in which a fast response electric traction machine is available in the powertrain.

The electronic stability control system coordinates between the brake system control module, traction control module and vehicle system control to control brake friction force and traction friction force on a driven axle to obtain much larger direct yaw moment for the driven axle. The faster response of the powertrain that includes an electric traction motor allows the system to achieve better traction torque control on the driven wheel than a conventional internal combustion engine powertrain. The system utilizes the maximum traction capacity of a driven axle for yaw moment generation and for stability control purpose to maximize the ability to provide vehicle stability control. The system has a greater ability to stabilize the vehicle in extreme scenarios when yaw stability control is necessary. Finally, the system can have better control on vehicle speed since the overall longitudinal traction force can be regulated based on need from vehicle level during the stability control mode.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A stability control system for a vehicle comprising:
   a brake controller configured to, based on a received instability signal, provide a brake force to a first wheel; and
   a motor controller configured to, based on the instability signal, provide a motor torque to a second wheel on an opposite side of the first wheel wherein the brake and motor signals are provided in a coordinated time sequence.

2. The control system of claim 1 wherein the motor controller reduces the motor torque provided by an electric motor to the second wheel to regain steering control.

3. The control system of claim 2 further comprising an internal combustion engine that selectively provides torque to the second wheel, and wherein an engine control is configured to reduce the torque provided by the internal combustion engine in conjunction with the motor controller reducing the torque provided by the electric motor to the second wheel to a negative level.

4. The control system of claim 1 wherein the motor torque provided by the motor controller increases the torque provided to the second wheel and is coordinated with the brake applying a braking force to the brake wheel to thereby provide increased direct yaw moment control.

5. The control system of claim 1 wherein the coordinated time sequence is synchronized.

6. The control system of claim 1 further comprising:
   a vehicle acceleration sensor is configured to provide an acceleration signal to the motor controller that is equal to zero when no vehicle acceleration is sensed; and
   wherein an overall drive force on a driven axle is equal to a sum of a brake friction force and a drive friction force, whereby an overall longitudinal traction force is regulated.

7. The control system of claim 1 further comprising:
   a vehicle acceleration sensor that is configured to provide an acceleration signal to the motor controller when negative vehicle acceleration is sensed; and
   wherein an overall drive force on a driven axle is less than a sum of a brake friction force and a drive friction force, whereby an overall longitudinal traction force is regulated.

8. The control system of claim 1 further comprising a vehicle acceleration sensor provides an acceleration signal to the motor controller when positive vehicle acceleration is sensed and wherein an overall drive force on a driven axle is greater than a sum of a brake friction force and a drive friction force, whereby an overall longitudinal traction force is regulated.

9. A stability control system for a vehicle having a drivetrain with a differential that selectively provides torque to at least two wheels comprising:
   a brake controller configured to receive the instability signal and provide a brake signal to the brakes of the vehicle to apply a braking force to a brake wheel on a first side of the vehicle; and
   a motor controller configured to response to the instability signal and provides a motor signal to an electric motor to reduce the torque provided to a traction wheel through a differential to regain steering control;
   wherein the motor controller is configured to receive a torque increase request signal from the brake controller and to increase the torque provided through the differential to the traction wheel on a second side of the vehicle to thereby provide increased direct yaw moment control and wherein the brake and motor signals are provided in a coordinated time sequence.

10. The stability control system of claim 9 wherein the brake signal is a pulsed signal that provides a pulsed braking force.

11. The stability control system of claim 10 wherein the torque increase signal corresponds to the pulsed signal and increases the torque provided to the traction wheel in a corresponding set of pulses.

12. The stability control system of claim 11 wherein the pulsed signal and the corresponding set of pulses are synchronous.

13. The stability control system of claim 9 wherein the torque increase signal corresponds to the brake signal and increases the torque provided to the traction wheel when the brake signal provides the braking force.

14. A method of providing stability control for a vehicle that has a plurality of sensors, a brake controller, and a motor controller, the method comprising:
   detecting a loss of steering control in the vehicle and generating an instability event signal by the plurality of sensors;
   receiving the instability event signal by the brake controller and providing a signal to the brakes of the vehicle to apply a braking force to a brake wheel on a first side of the vehicle; and
   receiving a torque increase request signal by the motor controller from the brake controller and increasing the torque provided to a traction wheel on a second side of the vehicle.

* * * * *